US006847348B2

(12) United States Patent
Rojewski

(10) Patent No.: US 6,847,348 B2
(45) Date of Patent: Jan. 25, 2005

(54) SYSTEMS AND METHODS FOR EXECUTING FUNCTIONS FOR OBJECTS BASED ON THE MOVEMENT OF AN INPUT DEVICE

(75) Inventor: Erwin Rojewski, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 212 days.

(21) Appl. No.: 10/101,099

(22) Filed: Mar. 20, 2002

(65) Prior Publication Data

US 2002/0135561 A1 Sep. 26, 2002

(30) Foreign Application Priority Data

Mar. 26, 2001 (EP) .............................................. 01107374

(51) Int. Cl.[7] .............................. G09G 5/00; G06K 9/00
(52) U.S. Cl. ....................... 345/156; 345/157; 382/181; 382/189
(58) Field of Search ................................. 382/181–189; 345/156, 157, 163, 179

(56) References Cited

U.S. PATENT DOCUMENTS

| 5,481,278 | A | * | 1/1996 | Shigematsu et al. | ......... | 345/179 |
| 5,517,578 | A | * | 5/1996 | Altman et al. | .............. | 382/181 |
| 5,745,719 | A | | 4/1998 | Falcón | | |
| 5,757,360 | A | * | 5/1998 | Nitta et al. | .................. | 345/156 |
| 6,369,807 | B1 | * | 4/2002 | Nakashima | .................. | 345/179 |

FOREIGN PATENT DOCUMENTS

| EP | 0 723 217 A1 | 7/1996 |
| WO | WO 99 42920 | 8/1999 |

OTHER PUBLICATIONS

G. Kurtenbach et al., "Issues in Combining Marking and Direct Manipulation Techniques," Proceedings of the ACM Symposium on User Interface Software and Technology, Hilton Head, South Carolina, USA, Nov. 11–13, 1991, pp. 137–144.
D. R. Millen, "Pen–Based User Interfaces," AT&T Technical Journal, American Telephone and Telegraph Co., New York, USA, vol. 72, No. 3, May 1, 1993, pp. 21–27.
Patent Abstracts of Japan, vol. 2000, No. 3, Mar. 30, 2000, Title: "Gesture Processor and Gesture Processing Method," Publication No.: JP 11345071, Publication Date: Dec. 14, 1999.
Patent Abstracts of Japan, vol. 1999, No. 10, Aug. 31, 1999, Title: "Screen Saver," Publication No.: JP 11143445, Publication Date: May 28, 1999.

* cited by examiner

Primary Examiner—Amr A. Awad
Assistant Examiner—Alecia D. Nelson
(74) Attorney, Agent, or Firm—Finnegan, Henderson, Farabow, Garrett & Dunner, L.L.P.

(57) ABSTRACT

Methods, computer program products and systems are provided for executing a function of a data processing computer system. The function may relate to an object. The method may be performed by: displaying a graphical representation of an object on a display device; receiving movement data from an input device, identifying a matching movement pattern that matches the cursor movement, which corresponds to the movement data; selecting a function that relates to the matching movement pattern and the object; and executing the function for the object. The identifying step can be performed by measuring the cursor movement as changes of the cursor coordinates occur. The result may then be compared to a plurality of predefined reference movement patterns. One movement pattern may be selected out of the plurality of reference movement patterns as the matching movement pattern for the object.

5 Claims, 8 Drawing Sheets

SYSTEMS AND METHODS FOR EXECUTING FUNCTIONS FOR OBJECTS BASED ON THE MOVEMENT OF AN INPUT DEVICE

BACKGROUND OF THE INVENTION

I. Field of the Invention

The present invention generally relates to data processing systems. More particularly, the invention relates to systems and methods for improving user interaction with data processing systems, including data processing systems implemented with computers.

II. Background Information

Typically, the interaction of a human user with a data processing system (such as a computer) occurs through a graphical user interface (GUI). A GUI may include a display device (such as a monitor) and an input device (such as a mouse). The user points at graphical objects that are displayed on the display device with a moving cursor that can be controlled by the user through the movement of the input device. To facilitate user interaction through graphical interfaces, buttons or a wheel for scrolling may be added to the input device. Such additional hardware allows the user to not only point at displayed objects, but also to execute designated functions in correlation with these objects by clicking mouse buttons or using the scrolling wheel. Through the use of such interfaces, a user is no longer forced to know all possible commands and to enter these commands in a command line editor in order to execute a corresponding function.

Mouse devices as an input device are well known in the art and have been improved continuously over time by adding more functionality to execute more functions in the context of a specific object. For example, when the position of the mouse cursor overlaps with the position of a graphical object on a display device of a computer system, different actions or functions can be executed for that object by using different buttons, such as the left or right mouse button. Typically, when clicking the left button once, the object is selected and, when clicking the left button twice, a program associated with the object is launched. Depending on the type of the object, launching can be, for example, to load the object into an editor of a word processing program or to start an executable program on the computer. When clicking the right button once, a context menu may be shown on the display device. The context menu provides an extended list of functions that can be executed for that object, usually also comprising the functions of the left button. For example, predefined functions in the context of a text object may include: to send the object to a printer; to delete the object; or to send it by e-mail to another person.

By way of example, FIG. 1 illustrates a simplified diagram of a conventional data processing system including a computer 1, a display device 2 and a mouse-like input device 3. Display device 2 and input device 3 are both connected to computer 1. The use of a mouse as an input device is well known in the art and, as stated above, has been enhanced continuously over time by adding more functionality to execute functions for a specific object.

In the example of FIG. 1, input device 3 has a right button 3-1 and a left button 3-2. Display device 2 shows an object 10 and a cursor 11. The position of cursor 11 on display device 2 is controlled by input device 3. When the position of cursor 11 overlaps with the position of the graphical representation of object 10 on display device 2, different functions can be executed in the context of object 10 by using the buttons 3-1 and 3-2. Typically, when clicking the left button 3-2 once, object 10 is selected and, when clicking the left button 3-2 twice, a program associated with the object is started. Depending on the type of object 10, starting can be, for example, to load the object into an editor or to start an executable program. When clicking the right button 3-1 once, a context menu 12 is shown on display device 2. Context menu 12 provides an extended list of functions F1' to F5' that can be executed for that object, comprising the functions of the left button 3-2. For example, predefined functions in the context of a text object may include: to send the object to a printer; to delete the object; or to send it by e-mail to a second person.

Some mouse devices have three buttons, where a user can assign functions to the third button (e.g., a double click function). Further, some mouse devices have an additional wheel for scrolling pages on the screen. However, such technological developments of mouse-like devices makes these devices more complex.

With the advent of laptops and notebook computers, track ball-based devices have been integrated with computer devices in an attempt to replace all the functions of a traditional mouse device. The track ball and mouse buttons may be physically separated. For some users, however, this arrangement might be inconvenient compared to traditional mouse-like devices.

Moreover, with computers becoming smaller and smaller in the form of personal digital assistants (PDAs), the mouse device has disappeared completely and been replaced by a pen-like device that writes directly on a touch sensitive display device, thus becoming the input device. However, for pen-like devices, a technical problem arises in that there's nothing like a second (e.g., right) or third mouse button to provide an input signal that is different from the first (e.g., left) button to show, for example, a context menu for a displayed object Therefore, large menus that offer all possible functions for all possible types of objects have to be displayed simultaneously on a very small-sized display. This requires, for example, to represent the functions by tiny icons or to have multi-layered menus that imply poor user interaction. This creates the problem of limited interaction functionality, especially for graphical user interfaces.

In view of the foregoing, embodiments of the present invention provide methods, computer program products and systems that solve the above-noted technical problems and/or improve user interaction with data processing systems, including computer devices.

SUMMARY OF THE INVENTION

To solve the technical problem of limited interaction of a user with a computer, embodiments of the present invention provide a method to execute a function of a data processing computer system in the context of an object. The object may comprise a graphical representation on a display device. According to such methods, the user performs a movement with an input device. The computer system receives the corresponding movement data that, preferably, represent a cursor movement on the display device. The cursor movement can be described as a sequence of cursor coordinates on the display device. A computer program product (CPP) identifies a predefined matching movement pattern in the cursor movement and associates the matching movement pattern with the object. The CPP may use the combination of the matching movement pattern and the object to select at least one function out of a plurality of functions. Finally, the function is executed for the object.

Systems and methods consistent with embodiments of the invention can provide numerous advantages. For example, the input device does not require a lot of hardware features. The input device can be used by handicapped persons, as well. Moreover, the user may be provided with direct access (no menu hierarchy needed) to multiple functions correlated to graphical objects by performing movements that are associated with that function. Further, the shape of the movement patterns can imply the function (e.g., a 'x' for deleting, an arrow for sending, a hook for confirming) and can, therefore, easily be remembered by the user.

In contrast to highly sophisticated input devices with a lot of hardware functions, such as a mouse, embodiments of the present invention may provide a convenient, software-based method to interact with the computer and to control the computer by mere movements of an input device. Even handicapped persons, who are not able to use a traditional input device, become enabled to interact with the computer by using input devices that capture movement data, such as the movement of any part of the person's body (e.g., head, arms, etc.).

In accordance with embodiments of the present invention, the matching movement pattern may be identified based on a pattern that fits the measured cursor movement. This can be achieved by comparing the cursor movement to a plurality of predefined movement patterns (such as a library of predefined movement patterns). Numerous advantages may be achieved by using a plurality or library of predefined movement patterns. For example, the library can be stored anywhere and can be exchanged easily. Moreover, the library can be created without great difficulty by those skilled in the art.

According to embodiments of the present invention, movement data received from the input device may be 3-dimensional. The advantage of such embodiments is that input devices, such as a data input glove, in combination with a 3-dimensional display device, such as virtual reality glasses, allow the user an additional degree of freedom for movements. This increases the possible number of intuitive reference movement patterns.

Consistent with still other embodiments of the present invention, visual feedback is provided to the user once a matching movement pattern has been recognized in the user's movements with the input device. For this purpose, a graphical representation of the matching movement pattern can be visualized on the display device and its size is automatically adjusted to the size of the cursor movement. The advantage is that the user is immediately notified when the movement pattern is identified and the corresponding function is executed. This avoids uncertainty of the user especially when the selected function is executed in the background and, therefore, prevents the user from performing the same movement again.

In accordance with other embodiments of the present invention, a technical solution is provided to execute different functions for the same movement pattern when operating in different environments. Different environments can be, for example, different countries, regions or cultures like the European, Asian or American culture. It is an advantage that the same libraries of predefined movement patterns can be used in all environments by just switching environment tables that always map the environment specific functions to the movement patterns.

Embodiments of the present invention may allow a further, personalized reference movement pattern to be added to the plurality (i.e., library) of movement patterns. For example, at least two different sets of movement data can be recorded from the input device, where the user preferably tries to perform the same movement in all of the recordings. A CPP calculates the average cursor coordinates from the previously recorded movement data resulting in an average shape. Tolerances for the average shape are also calculated by using, for example, a standard deviation calculation. Both the average shape and tolerances are then stored as a new reference movement pattern. The advantage is that a user's specific way of moving the input device is taken into consideration in the reference movement pattern. Therefore, the user does not need to learn to move the input device according to predefined movement patterns. Rather, the system learns to recognize the movement data that are typical for the user. Further, once a new reference movement pattern is stored, a function can be assigned to the reference movement pattern by the user. A mapping table or other means may be utilized to record the assignment.

In some cases, the same movement pattern can imply more than one function. This problem can be solved through embodiments of the invention, where besides the movement data from the input device, a further signal is received from a further input device. A function is selected for the object out of the plurality of functions depending on the combination of the matching movement pattern with the signal. The advantage is that, for example, when performing a circle movement around the object with the input device, the object is selected but when simultaneously pressing a "Print" key on the further input device (e.g., a keyboard), the object content is directly sent to a printer.

It might be convenient to execute a function for more than one object by a single movement of the input device. For example, consistent with embodiments of the present invention, a further cursor movement and the corresponding matching movement pattern are correlated with a plurality of objects. The advantage is that, for example, all circled objects are subject to the function that is correlated with the corresponding matching movement pattern (e.g., launching the object) for each of the objects.

Movement patterns, such as a signature movement of a user, that are used to execute functions that are critical from a security point of view (e.g., log on to a system with personal data) have to be unique for a specific user to avoid misuse by other persons. Consistent with embodiments of the present invention, a solution is provided to add contact sensitive information from the input device to the cursor movement data. For example, a pressure value may be measured at each cursor coordinate for the complete cursor movement. Therefore, the measured pressure values become part of the cursor movement data and are used in the comparison with the predefined movement patterns that comprise pressure values, respectively. When combined with personalized recordings of further reference movement patterns, movement patterns become unique for a specific user because the pressure value at each coordinate of the cursor movement is a user specific, individual value that can hardly be copied by another user. Such a unique movement pattern can be used to create a digital signature, as further disclosed herein.

In accordance with additional embodiments of the invention, a computer system is provided that comprises means in form of executable program code that allow the system to perform all method steps of embodiments of the present invention. For example, to execute a function relating to an object, a first means displays a graphical representation of an object on a display device. A second means receives movement data from an input device, where the movement data describe a cursor movement on the display device. The cursor movement goes through cursor coordinates of the display device. A third means identifies a matching movement pattern in the cursor movement for the object, wherein the matching movement pattern is a predefined movement pattern. A fourth means selects a function out of a plurality of functions for the object, The function is assigned to the matching movement pattern. A fifth means executes the function in relation to the object.

Consistent with embodiments of the invention, the third means may comprise further means to identify the matching movement pattern. A sixth means measures the cursor movement as changes of the cursor coordinates occur. A seventh means compares the cursor movement to the plurality of predefined reference movement patterns. An eighth means selects one movement pattern out of the plurality of predefined movement patterns as the matching movement pattern that relates to the object.

In accordance with yet additional embodiments of the invention, the computer system further comprises means for adding a reference movement pattern to the plurality of movement patterns. This may be achieved by: recording a first set of movement data from the input device; recording a second set of movement data from said input device; calculating average cursor coordinates and tolerances from the previously recorded sets of movement data resulting in the shape of reference movement pattern; and storing the result of the calculation as a further reference movement pattern in the plurality of reference movement patterns.

It is to be understood that both the foregoing general description and the following detailed description are exemplary and explanatory only, and should not be deemed restrictive of the full scope of the embodiments of the invention.

BRIEF DESCRIPTION OF THE DRAWINGS

The accompanying drawings, which are incorporated herein and constitute a part of this specification, illustrate various features and aspects of embodiments of the invention. In the drawings.

DETAILED DESCRIPTION

While in the prior art, a lot of functionality, such as left and right mouse buttons, was added to the input device to allow convenient execution of functions in the context of a displayed object, embodiments of the present invention provide a technical solution to execute functions for an object (that is, functions that are associated with that object) by simply moving an input device in relation to the object without any further need for additional functionality of the input device.

Embodiments of the present invention also add value to simple input devices, such as pen-like devices with a touch screen, that don't provide the functional capabilities of a mouse device. Therefore, embodiments of the present invention provide a convenient, technical solution to execute functions in the context of an object with an easy interaction model for the interaction of a human user with the computer device. Thereby, the interaction model may take into account that the input device can be moved at variable speed and pressure.

Figure 1:
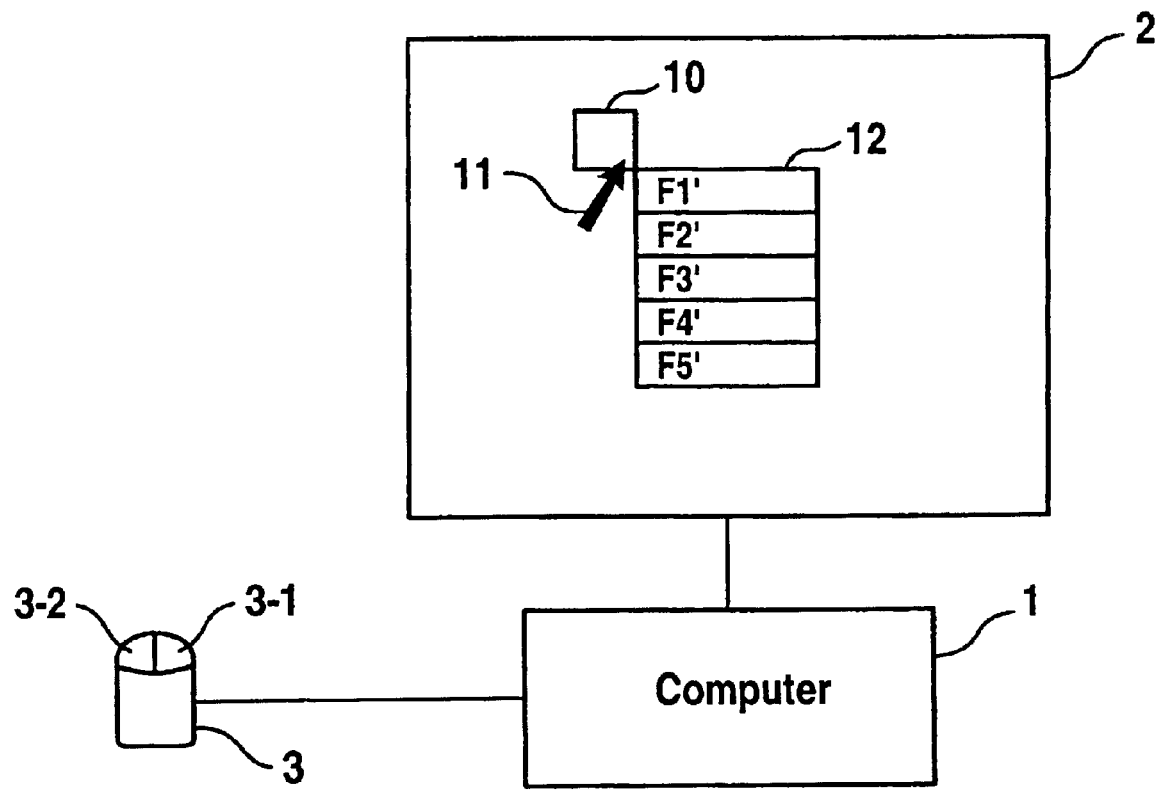
FIG. 1 illustrates a simplified diagram of a computer, a display device and an input device of the prior art.
Figure 2:
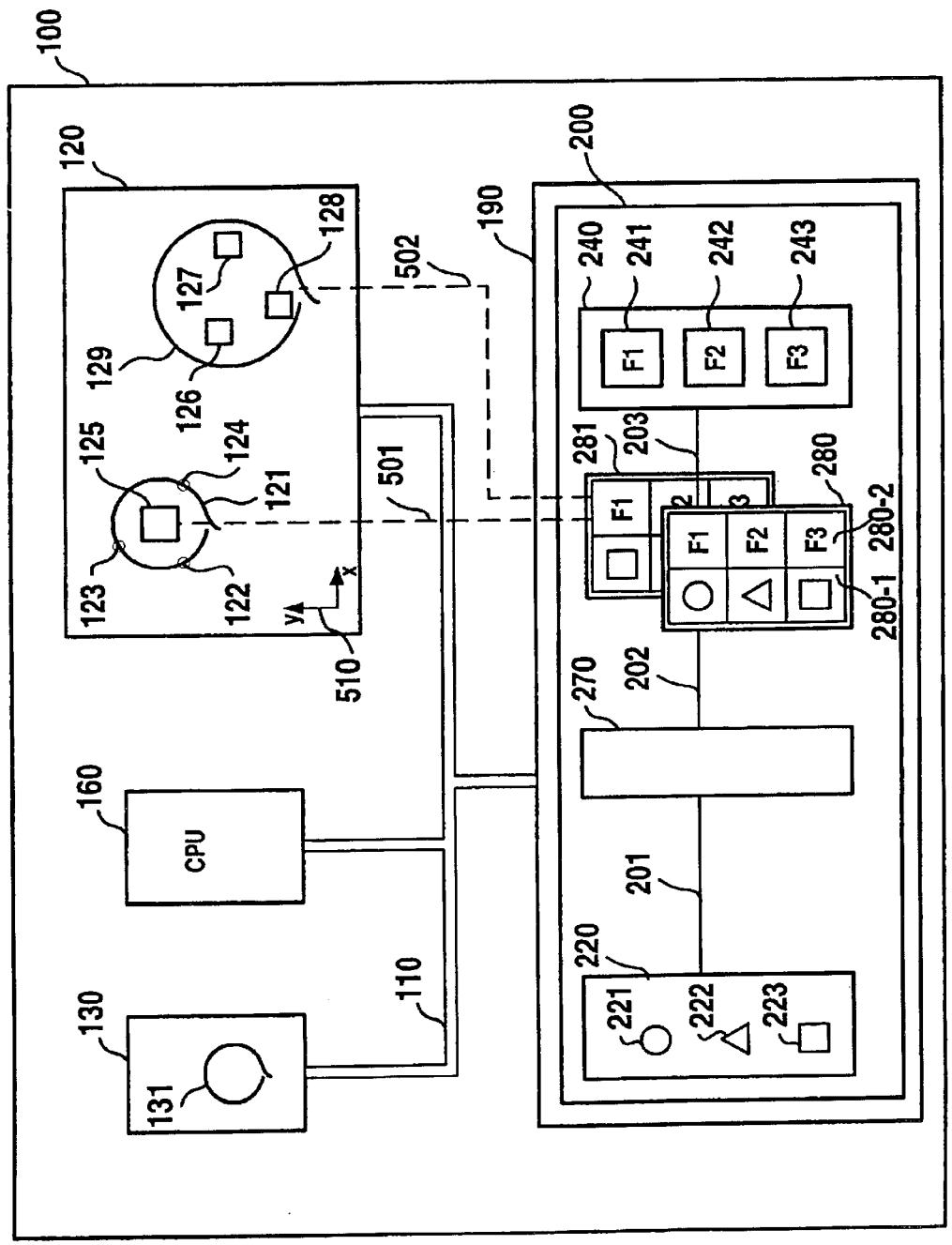
FIG. 2 illustrates an exemplary, functional block diagram of a computer system, consistent with embodiments of the present invention.

FIG. 2 illustrates an exemplary, functional block diagram of a computer system 100, consistent with embodiments of the present invention. Computer system 100 may operate according to the present invention by using a computer program product (CPP) 200. Computer system 100 can be, for example, a personal computer with a mouse, a keyboard and a monitor or a personal digital assistant (PDA) with a stylus and a touch screen. Computer system 100 can also be any other type of computer system that allows interaction with a user.

As illustrated in FIG. 2, computer system 100 comprises an input device 130, a display device 120, a processor 160 (such as a central processing unit (CPU)), and a memory device 190 communicating through a bus 110. Computer program product (CPP) 200 resides in memory device 190 and is executed by processor 160. For convenience of explanation, a plurality 220 of reference movement patterns 221–223 is shown as part of CPP 200. However, this is not required. Persons of skill in the art can build plurality 220 also in the memory portion of a further computer system (not shown in FIG. 2) that is connected to computer system 100, for example, by a network. The term reference movement pattern will be explained later.

Further components of CPP 200 include: a pattern identifier 270, first and second environment tables 280 and 281, a plurality 240 of functions 241 to 243 (functions F1 to F3). Pattern identifier 270 communicates with plurality 220 via interface 201 and with first and second environment tables 280, 281 via interface 202. Environment tables 280, 281 communicate with plurality 240 via interface 203. The purpose of these components is explained in the context of the following figures.

Assignments 501 and 502 are shown as dashed lines in FIG. 2. Assignment 501 indicates that environment tables 280, 281 are assigned to object 125 because they comprise functions F1 to F3 that are all applicable to object 125. Assignment 502 indicates that the functions in tables 280, 281 are also applicable to a plurality of objects 126–128.

Icon 510 symbolizes a coordinate system of display 120. Consistent with embodiments of the present invention, it is not important where the origin of the coordinate system 510 is located. Using the term "coordinate" always refers to coordinates of coordinate system 510. Preferably, coordinate system 510 is a Cartesian coordinate system with at least x- and y-coordinates.

Figure 3:
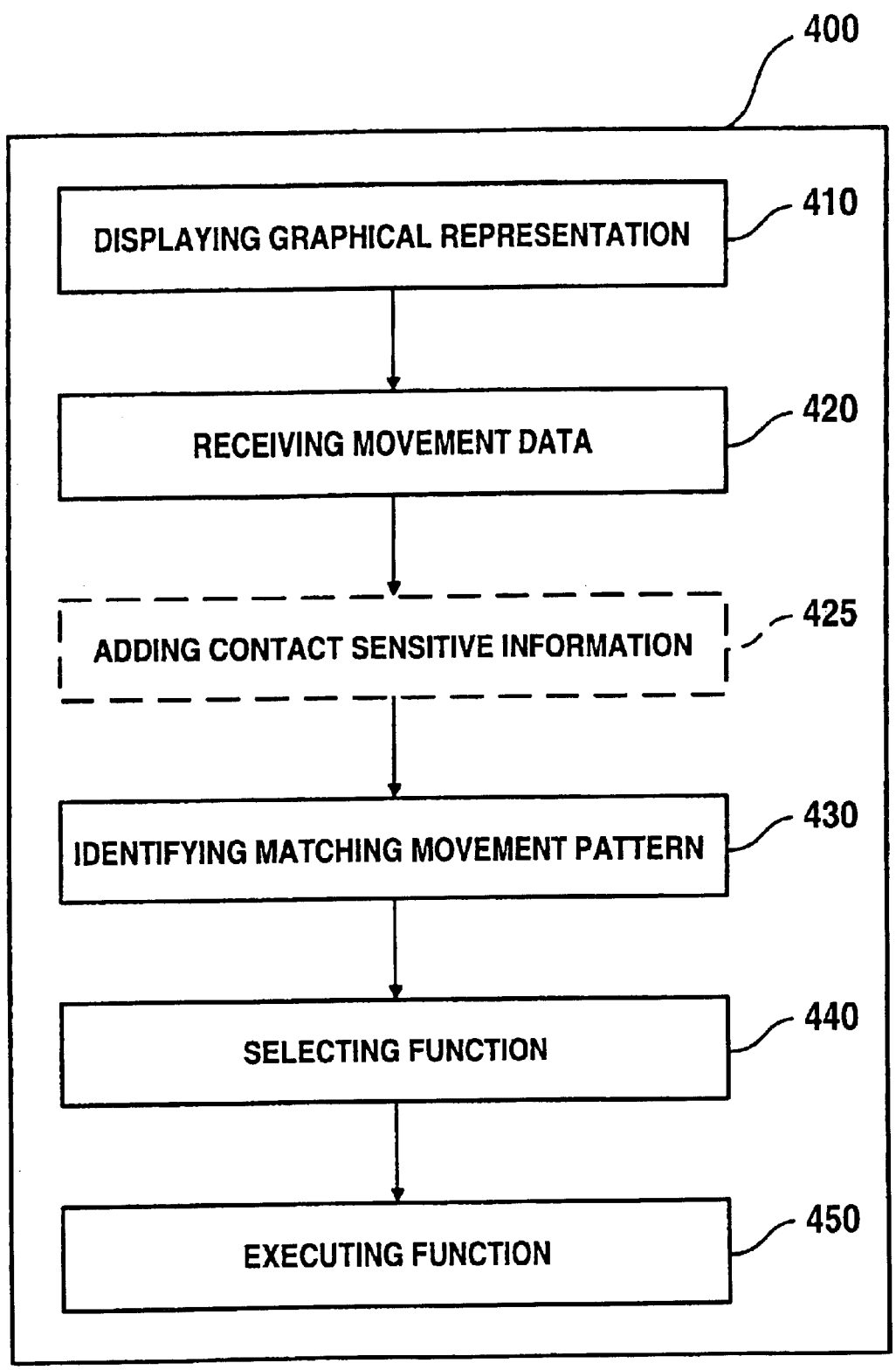
FIG. 3 illustrates an exemplary flowchart diagram of a method, consistent with embodiments of the present invention.

FIG. 3 illustrates an exemplary flowchart diagram of a method 400, consistent with embodiments of the present invention. Method 400 is performed, preferably, by computer system 100 using CPP 200 to execute at least one function (e.g., 241–243) for an object, such as object 125. Object 125 is a graphical representation on display device 120 of, for example, a text file, a graphics file, an executable program file, a hyperlink or the like. Functions 241–243 and their labels F1-F3 (cf. FIG. 2) are used as equivalents herein.

Consistent with embodiments of the present invention, method 400 may comprise the following steps: displaying a graphical representation (step 410), receiving movement data (step 420), identifying a matching movement pattern (step 430), selecting a function (step 440), and executing the function (step 450).

In step 410, computer system 100 may display object 125 on display device 120. As indicated, the graphical display of object 125 on display device 120 may represent, for example, a text file, a graphics file, an executable program file, a hyperlink or the like.

In step 420, computer system 100 receives movement data 131 through input device 130 that is moved by the user. Movement data 131 may be visualized as cursor movement 121 on display device 120. While the cursor is moving, the cursor coordinates change. Cursor movement 121 is defined through a sequence of cursor coordinates, for example, cursor movement 121 firstly goes through the cursor coordinate 122 and afterwards goes through cursor coordinates 123 and 124. It is convenient that input device 130 provides 2-dimensional movement data. However, input devices, such as interactive gloves, that are well known in the art can provide 3-dimensional movement data. Such 3-dimensional movement data may then be displayed on 2-dimensional display device 120 as pseudo-3-dimensional graphics. A further embodiment of display device 120 is a real, 3-dimensional display device, such as a hologram projector to produce real 3-dimensional graphics.

In step 430, CPP 200 (cf. FIG. 2) identifies a matching movement pattern 221 in the cursor movement 121 for the object 125, wherein the matching movement pattern 221 is a predefined reference movement pattern (e.g., 221–223).

In accordance with an embodiment of the invention, CPP 200 comprises a pattern identifier 270 (cf. FIG. 2) that measures cursor movement 121 as changes of the cursor coordinates 122 to 124 occur over time. Preferably, the changes are defined in relation to object 125. Pattern identifier 270 compares cursor movement 121 to a plurality 220 of predefined reference movement patterns 221 to 223 based on the changes of the cursor coordinates 122 to 124. Further, pattern identifier 270 may select one movement pattern out of the plurality 220 of predefined reference movement patterns as the matching movement pattern 221 for object 125.

In step 440, CPP 200 selects at least one function F1 out of plurality 240 of functions F1, F2, F3 for object 125, wherein function F1 is assigned to matching movement pattern 221 (e.g., a "circle"). Consistent with an embodiment of the present invention, CPP 200 comprises an environment table 280. Environment table 280 is an assignment table where functions F1, F2, F3 in the right column 280-2 of table 280 are assigned to predefined reference movement patterns 221 to 223 in the left column 280-1 of table 280. The dashed line 501 (cf. FIG. 2) indicates that in table 280, only functions that are applicable to object 125 (column 280-2) are assigned to corresponding predefined reference movement patterns in column 280-1.

Sometimes graphical symbols have different meanings in different countries, regions or cultures. For example, in some countries a cross often is used as a check mark, whereas in other countries the check mark typically is represented by a hook and the cross stands for 'delete'. The technical problem of assigning the same function to different symbols for different environments is solved by the ability of CPP 200 to load one or more additional environment tables. For example, a second environment table 281 may be provided, where the assignments of functions (F1, F2, F3) to corresponding predefined reference movement patterns are different. When activating table 281 by, preferably, setting an activation flag for the table, CPP 200 selects function F1 when square 223 is identified by pattern identifier 270. Before, with table 280 being the active table, F1 was selected when circle 221 was identified.

In step 450, processor 160 executes computer program instructions that correspond to selected function F1 for object 125.

In optional step 425 (dashed frame, cf. FIG. 3), CPP 200 may receive contact sensitive information (e.g., pressure values) from the input device 130. Thus, besides measuring cursor movement 121 as described in step 430, the pattern identifier 270 also measures a pressure value at each cursor coordinate for the complete cursor movement 121. This pressure value, which becomes part of cursor movement data 121, is used in comparison of cursor movement data 121 with the plurality 220 of reference movement patterns in step 430, wherein each reference movement pattern comprises pressure values, too.

Sometimes it is convenient for the user to get graphical feedback on display device 120 when a matching movement pattern is identified by system 100. Especially, when a function for object 125 is executed in the background, such as a batch job (computer program running in the background) that is running overnight, the user might not know, if movement data 131 on input device 130 were really recognized by pattern identifier 270.

Therefore, optionally, once matching movement pattern 221 is identified as being correlated with the cursor movement 121, a graphical representation of the shape of matching movement pattern 221 is displayed on display device 120 in the area where cursor movement 121 occurred. Persons with skills in the art of user interface programming can adjust the size of the graphical representation of matching movement pattern 221 according to the size of the original cursor movement data 121.

Figure 4:
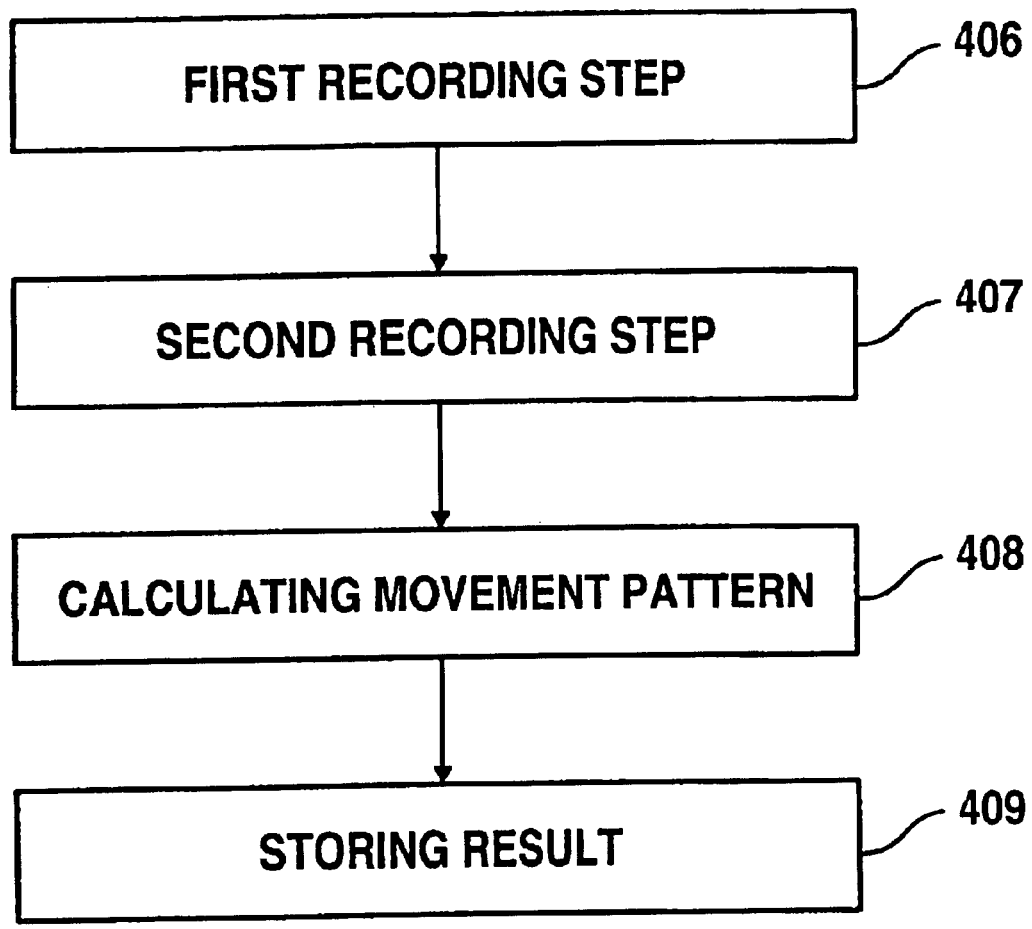
FIG. 4 illustrates an exemplary flowchart diagram of an additional, optional step for the method of FIG. 3, consistent with embodiments of the present invention.

FIG. 4 illustrates an exemplary flowchart diagram of the details of an additional, optional step 405 for method 400. Consistent with embodiments of the invention, optional step 405 may add a further reference movement pattern 225 to the plurality 220 of movement patterns. Preferably, step 405 is performed before step 410 or after step 450 of method 400 (cf. FIG. 3) in the following order by using an embodiment of pattern identifier 270 (cf. FIG. 5).

As illustrated in FIG. 4, a first set 135-1 of movement data (cf. FIG. 5) is recorded (step 406) from input device 130. Pattern identifier 270 measures the movement data according to step 430 of method 400 (cf. FIG. 3). The measurement result 271-1 may be temporarily stored in intermediate storage portion 271 of pattern identifier 270.

Afterwards, a second set 135-2 of movement data is recorded (step 407) from input device 130.

Pattern identifier 270 calculates, in step 408, a shape 271-99 of reference movement pattern 225 and tolerances 271-0 for the movement pattern by averaging the results 271-1 and 271-2 obtained by repetition of the previous recordings (steps 406 and 407). It is not relevant which formula or algorithm is applied to calculate shape 271-99 and tolerances 271-0. Any formula known in the art that is applicable to calculate geometrically averaged shapes may serve the purpose of calculating a reference movement pattern 225 that can be added to plurality 220. Thus, a person of skill in the art, like a programmer in the area of image processing, may define a formula that suits best the requirements of system 100 in a given situation.

Referring again to FIG. 4, pattern identifier 270 updates plurality 220 of reference movement patterns by storing, in step 409, the result of the average shape calculation as further reference movement pattern 225 in plurality 220. The update is indicated by arrow 272 (cf. FIG. 5). Once the new reference movement pattern is stored, a function can be assigned to the reference movement pattern by the user. A mapping table or other means may be utilized to record the assignment.

Figure 5:
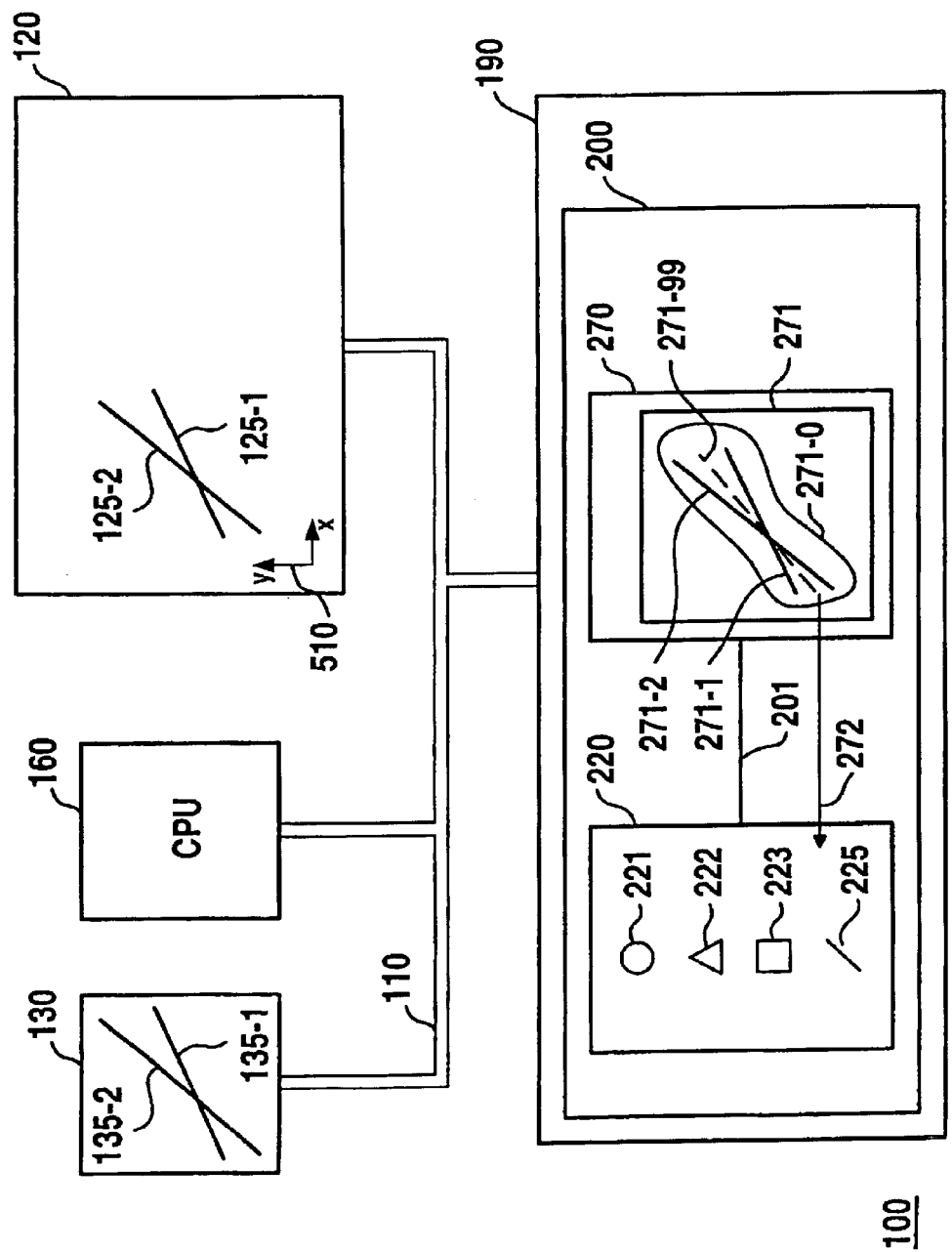
FIG. 5 illustrates an exemplary block diagram of a system for the optional step of FIG. 4, consistent with embodiments of the present invention.

FIG. 5 illustrates an exemplary block diagram of system 100 for implementing optional step 405 of method 400. Preferably, step 405 can be executed before step 410 or after step 450. Reference movement pattern 225 that, in the example, has the shape of a forward slash is added to plurality 220. Movement data 135-1 and 135-2 of input device 130 are sequentially received by system 100 through input device 130 and sequentially displayed as cursor movement data 125-1 and 125-2. Although shown as solid lines 125-1, 125-2 in FIG. 5, the cursor movements are defined as a sequence of discrete, single cursor coordinates on display device 120. Pattern identifier 270 holds recorded movement data 271-1 and 271-2 in parallel in intermediate storage portion 271. Recorded movement data 271-1, 271-2 correspond to cursor movement data 125-1, 125-2, respectively. Pattern identifier 270 calculates average shape 271-99 and tolerances 271-0. The tolerances 271-0 indicate the maximum deviation of each cursor coordinate of a cursor movement from the cursor coordinates of the average shape that is allowed so that pattern identifier 270 still correlates the cursor movement with the average shape 271-99. Pattern identifier 270 then updates 272 plurality 220 by storing reference movement pattern 225 comprising the information about shape 271-99 and tolerances 271-0.

Figure 6:
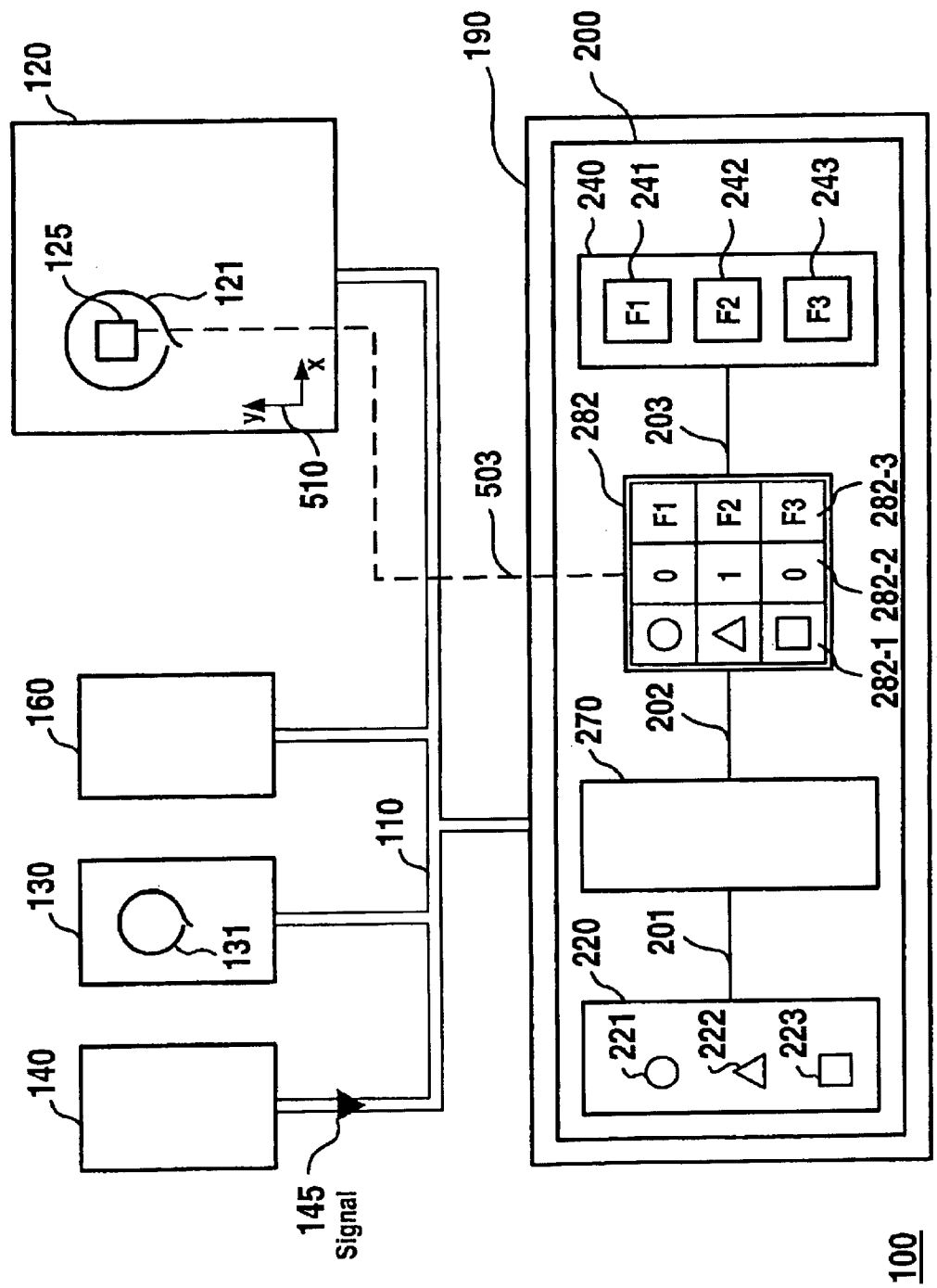
FIG. 6 illustrates an exemplary, functional block diagram of a system, consistent with embodiments of the present invention.

FIG. 6 illustrates an exemplary functional block diagram of system 100 (cf. FIG. 2), operating according to embodiments of the present invention, that introduces the following further elements: a further input device 140 and a third environment table 282. Pattern identifier 270 receives signal 145 from further input device 140 together with movement data 131. For example, this can be achieved when further input device 140 is a keyboard and a key, such as the 'Print' key is pressed, while moving the input device 130. In this example, environment table 282 is used (instead of environment table 280) in step 440 of method 400. Table 282 is an assignment table that comprises three columns 282-1 to 282-3. Each function F1, F2, F3 in the right column 282-3 of table 282 is assigned to a combination of predefined reference movement patterns 221 to 223 in the left column 282-1 of table 282 and a value of signal 145 (e.g., 0 or 1) in the middle column 282-2 of table 282. The dashed line 503 in FIG. 6 indicates that only functions that are applicable to object 125 are assigned to Combining the movement data of input device 130 with the signal 145 of further input device 140 is of advantage in some cases when the same mov Turning back to FIG. 2, display device 120 displays graphical representations of objects 126–128. Pattern identifier 270 identifies matching movement pattern 221 for further cursor movement 129 and sequentially executes function F1 for objects 126–128 automatically. CPP 200 always selects all objects that are subject to the execution of function F1 by correlating the objects to a matching movement pattern. Alternative embodiments 300 and 350 describe how to correlate matching movement patterns to the appropriate objects and are explained with reference to FIG. 7.

Figure 7:
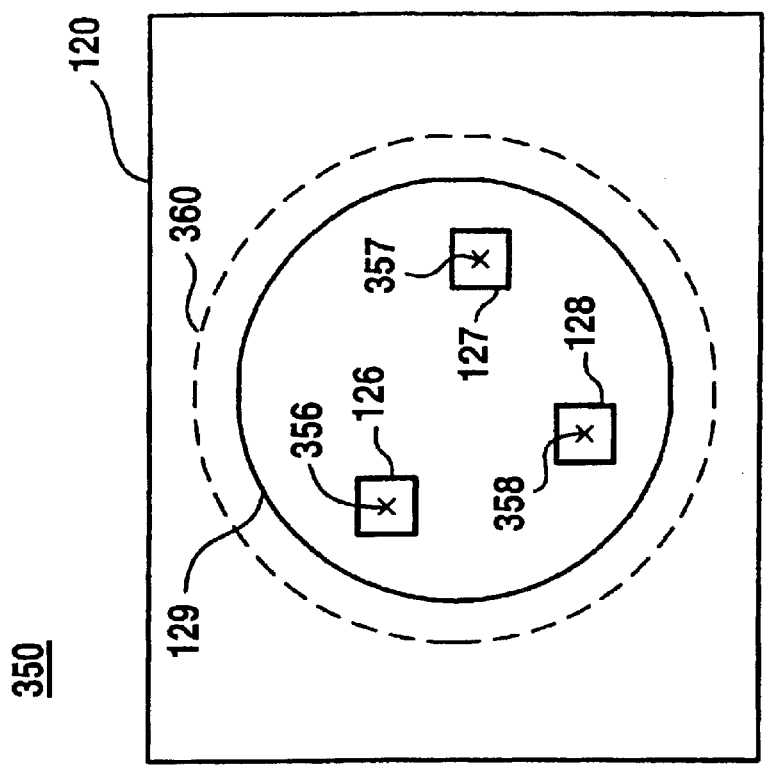
FIG. 7 illustrates alternative solutions for object correlation, consistent with embodiments of the present invention.
Figure 7:
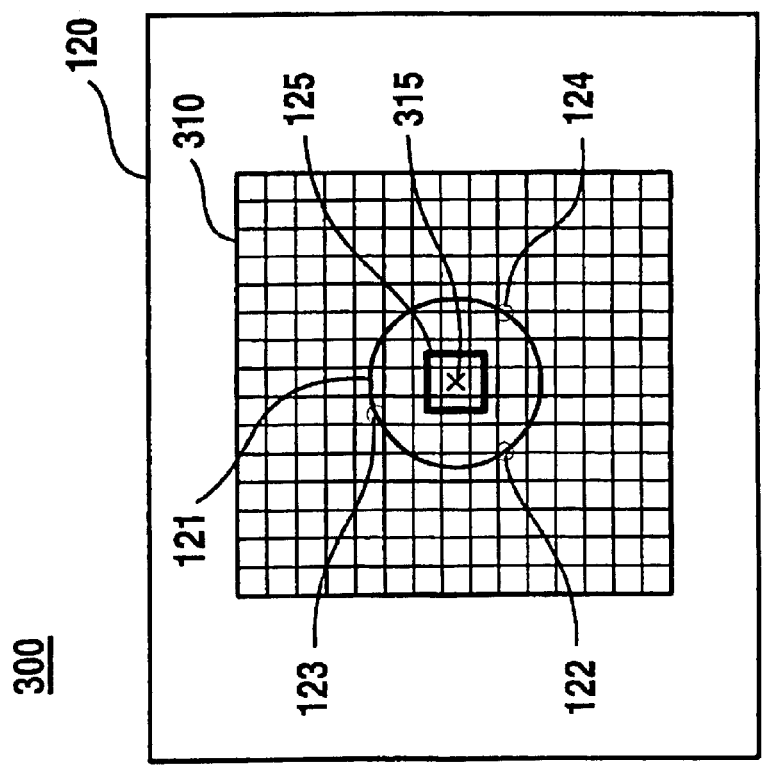

FIG. 7 illustrates two alternative solutions for object correlation, consistent with embodiments of the present invention. Embodiment 300 illustrated in FIG. 7 provides a first solution for correlating matching movement pattern 221 with object 125. In this embodiment, a virtual grid 310 is permanently associated with object 125. Grid 310 describes a specific segmentation of the display area around object 125. For example, grid 310 can be implemented as an invisible structure in a portion of memory 190 (not shown) that stores data for display. Grid 310 is preferably centered at object center 315, but it is sufficient that a designated coordinate of grid 310 (e.g., the center) is in a defined relationship to a designated coordinate of object 125. The size of grid 310 is automatically adjusted to the size of the graphical representation of object 125. For example, this is achieved by varying the width and height of grid 310 until a predefined ratio of the grid size compared to the object size is calculated. It is not important whether the sizing calculation is performed by a standard graphics display software (not shown) or by any other software component of system 100. Cursor coordinates 122–124 of cursor movement 121 are located within the area of grid 310 that relates to object 125. Therefore, the correlation of cursor movement 121 and object 125 is established. The correlation of matching movement pattern 221 with object 125 is established because matching movement pattern 221 is identified for cursor movement 121 (described in step 430 of method 400) and cursor movement 121 occurred in grid 310 that relates to object 125.

Embodiment 350 illustrated in FIG. 7 provides a second solution for correlating matching movement pattern 221 with a plurality of objects 126–128. In this embodiment, for example, the operating system of system 100 (not shown), continuously transfers further cursor movement data 129 to pattern identifier 270 (cf. FIG. 2). Once pattern identifier 270 identifies matching movement pattern 221, CPP 200 determines object selection area 360 based on further cursor movement 129 and, for example, the tolerances that are stored with matching movement pattern 221 in plurality 220. CPP 200 then identifies object centers 356–358 as lying inside area 360 and, therefore, correlates matching movement pattern 221 with objects 126–128, respectively.

Figure 8:
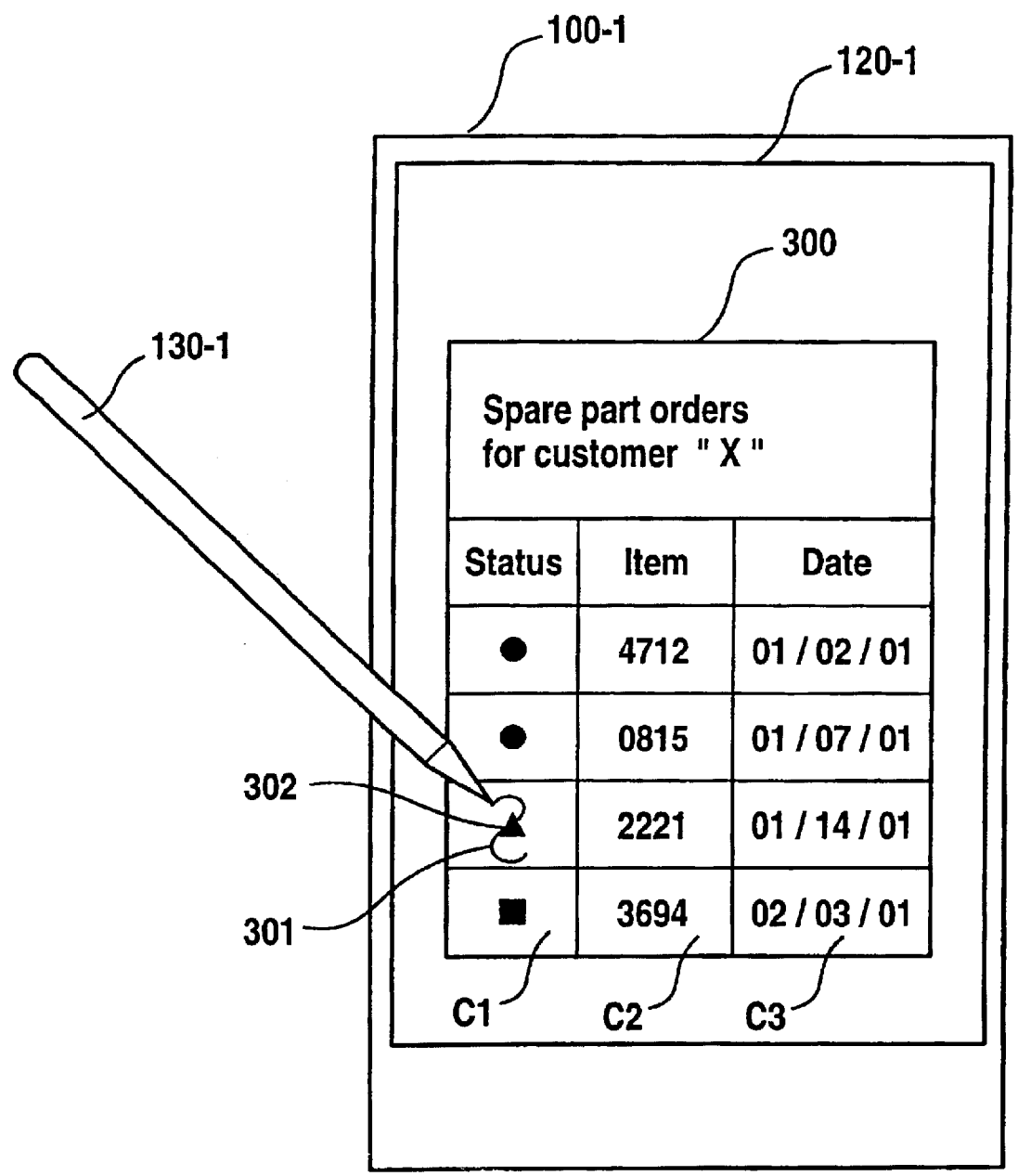
FIG. 8 illustrates a further embodiment of the present invention.

FIG. 8 illustrates a further embodiment of the present invention that includes a personal digital assistant (PDA) 100-1 with a display device 120-1 and a stylus input device 130-1. The PDA, for example, serves as a front-end computer to remotely launch application services provided by an application system, such as the SAP R/3 system. Application window 300 shows a simplified view of a list of spare part orders for a customer. Each row in the list corresponds to an order for this customer. The list has three columns C1, C2, C3 where the left column C1 shows icons for the current status (e.g., a bullet icon) of each order; the middle column C2 shows the item number (e.g., 4712) and the right column C3 shows the order date (e.g., Jan. 2, 2201). For example, the triangle icon 302 in the status column C1 indicates an alert for the corresponding order (e.g., for item 2221). The user performs stylus cursor movement 301 on the contact sensitive PDA display 120-1 on status object 302. The shape of movement 301 resembles, for example, the shape of a question mark.

As described in step 430 of method 400, a matching movement pattern is identified and a corresponding function, for example, a query showing details of the order status on the PDA display 120-1 is executed, because this function is assigned to the matching movement pattern for a status object.

When the user wants to confirm the order, the user performs another movement on object 302, such as a check mark shaped movement, and a corresponding confirmation function is executed for the order.

In accordance with embodiments of the present invention, a computer system 100 is provided that executes a function relating to object 125. System 100 may comprise the following components: a first means that displays a graphical representation of object 125 on display device 120; a second means that receives movement data 131 from input device 130, wherein movement data 131 describe cursor movement 121 on display device 120 and cursor movement 121 goes through cursor coordinates 122 to 124; a third means that identifies matching movement pattern 221 in cursor movement 121 for object 125, wherein the matching movement pattern 221 is part of plurality 220 of predefined movement patterns; a fourth means that selects function 241 out of plurality 240 of functions for object 125, wherein function 241 is assigned to matching movement pattern 221; and a fifth means that executes function 241 for object 125.

According to embodiments of the invention, the third means of computer system 100 may further comprise: a sixth means that measures cursor movement 121 as changes of the cursor coordinates 122 to 124 occur; a seventh means that compares cursor movement 121 to plurality 220 of predefined reference movement patterns; and an eighth means that selects one movement pattern out of plurality 220 of predefined movement patterns as matching movement pattern 221 for object 125.

Computer system 100 optionally comprises a further, ninth means for adding further reference movement pattern 225 to plurality 220 of movement patterns by: recording 406 first set 135-1 of movement data from input device 130; recording 407 second set 135-2 of movement data from input device 130; calculating 408 shape 271-99 of further reference movement pattern 225 and tolerances 271-0 for the pattern by averaging the results obtained by repetition of previous recordings 406, 407; and storing 409 the result of the calculation as further reference movement pattern 225 in plurality 220 of reference movement patterns.

In accordance with still further embodiments of the present invention, a computer program product 200 may be provided that comprises program instructions for causing processor 160 to perform all steps and functions of embodiments of the invention disclosed herein under the descriptions for FIGS. 2 to 8. Computer program product 200 may be stored in computer memory 190. Further, computer program product 200 can be embodied on a record medium or in a read-only memory. Computer program product 200 can also be carried on an electrical signal carrier, for example, when CPP 200 is downloaded from a storage device to system 100 through a network connection.

Other embodiments of the invention will be apparent to those skilled in the art from consideration of the specification and practice of the invention disclosed herein. In addition, the invention is not limited to the particulars of the embodiments disclosed herein. For example, the individual features of the disclosed embodiments may be combined or added to the features of other embodiments. In addition, the steps of the disclosed methods may be combined or modified without departing from the spirit of the invention claimed herein.

Accordingly, it is intended that the specification and embodiments disclosed herein be considered as exemplary only, with a true scope and spirit of the embodiments of the invention being indicated by the following claims.

What is claimed is:

1. A method for executing at least one function of a data processing computer system, said function relating to an object, the method comprising:

displaying a graphical representation of an object on a display device;

receiving movement data from an input device, said movement data representing a cursor movement on the display device, said cursor movement going sequentially through cursor coordinates;

identifying a predefined matching movement pattern in said cursor movement for said object via a grid that is associated with the object, wherein the size of the grid depends on the size of the object;

selecting at least one function out of a plurality of functions for said object, wherein said function is assigned to said matching movement pattern; and executing said selected function for said object, wherein the method further comprises adding a further reference movement pattern to the plurality of movement patterns, and further wherein adding said further reference movement pattern comprises:

recording a first set of movement data from the input device;

recording a second set of movement data from the input device;

calculating average cursor coordinates and tolerances from the previously recorded sets of movement data to determine a shape of the further reference movement pattern; and storing the result of the calculation as the further reference movement pattern in the plurality of reference movement patterns.

2. The method of claim 1, wherein a digital signature is created for a user from the further reference movement pattern, wherein said further reference movement pattern comprises contact pressure values.

3. A computer program product comprising program instructions for causing a processor to perform the method of claim 1 or 2.

4. A computer program product according to claim 3, wherein the computer program product is embodied in at least one of a recordable medium, a computer memory, a read-only memory and an electrical signal carrier.

5. A computer system for executing a function relating to an object, comprising:

first means for displaying a graphical representation of an object on a display device;

second means for receiving movement data from an input device, said data describing a cursor movement on the display device, said cursor movement going through cursor coordinates;

third means for identifying a predefined matching movement pattern in said cursor movement for said object via a grid that is associated with the object, wherein the size of the grid depends on the size of the object;

fourth means for selecting a function out of a plurality of functions for said object, wherein said function is assigned to said matching movement pattern; and fifth means for executing said function for said object, wherein the system further comprises means for adding a reference movement pattern to the plurality of movement patterns by:

recording a first set of movement data from the input device;

recording a second set of movement data from said input device;

calculating average cursor coordinates and tolerances from the previously recorded sets of movement data to determine a shape of the further reference movement pattern; and storing the result of the calculation as the further reference movement pattern in the plurality of reference movement patterns.

* * * * *